United States Patent

[11] 3,574,288

| [72] | Inventors | Wallace E. Barth<br>Birmingham;<br>William E. Bell, Berkley, Mich. |
|---|---|---|
| [21] | Appl. No. | 863,290 |
| [22] | Filed | Oct. 2, 1969 |
| [45] | Patented | Apr. 13, 1971 |
| [73] | Assignee | General Motors Corporation<br>Detroit, Mich. |

[54] TRANSMISSION DISABLING APPARATUS
3 Claims, 1 Drawing Fig.

[52] U.S. Cl. ................................................. 74/850, 123/179, 180/82
[51] Int. Cl. ..................................................B60k 27/02, B60k 27/08, F02n 11/10
[50] Field of Search ........................................... 74/850; 123/179 (A), 179 (K); 180/82; 192/.052

[56] References Cited
UNITED STATES PATENTS

| 2,102,909 | 12/1937 | Paton | 123/179A |
| 2,174,313 | 9/1939 | Coffey | 123/179AX |
| 2,374,303 | 4/1945 | Osborne | 123/179KX |
| 2,824,459 | 2/1958 | Thibodeau | 123/179KX |
| 2,968,967 | 1/1961 | Ross, Jr. | 74/850X |

*Primary Examiner*—Mark M. Newman
*Assistant Examiner*—Thomas C. Perry
*Attorneys*—Jean L. Carpenter, Paul Fitzpatrick and Warren D. Hill ABSTRACT: An automatic transmission in a vehicle is provided with a solenoid valve for dropping transmission fluid pressure. A relay circuit in conjunction with a conventional engine starting circuit actuates the solenoid valve to disable the transmission during the engine starting period.

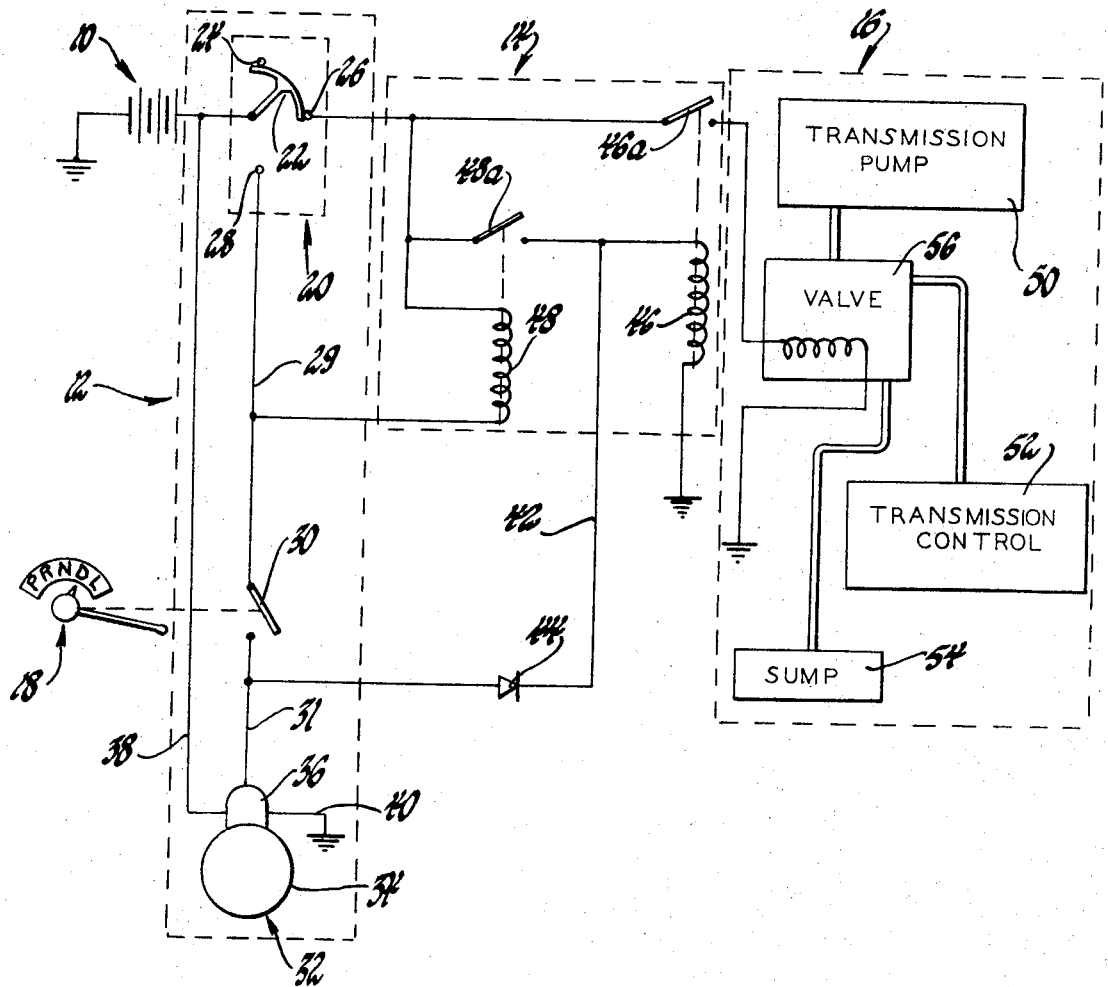

TRANSMISSION DISABLING APPARATUS

This invention relates to apparatus for disabling an automatic transmission during engine starting and more particularly, to an electrical control apparatus for disabling a transmission.

It is generally recognized to be desirable when starting the engine of an automotive vehicle having an automatic transmission that the transmission be conditioned so that it is inoperable to drive the vehicle during the starting period. Ordinarily this is accomplished by a neutral safety switch operated by the transmission range selector linkage, which switch renders the starter motor inoperative except when the range selector has been moved to a neutral setting. This invention contains the neutral safety switch but in addition, provides a way of positively disabling the transmission during the starting period so that even if some malfunction permitted closing of the neutral safety switch while the transmission was in a drive range, the transmission would not be operative to move the vehicle.

It is therefore a general object of this invention to provide apparatus for disabling a vehicle transmission during engine starting.

It is another object of this invention to provide a control circuit to effect disabling of an automatic transmission during starting of the vehicle engine.

The invention is carried out by providing, in a transmission, electrically actuated means for rendering the transmission inoperative and control circuitry for actuating the disabling means during engine starting.

The invention is further carried out by providing a relay circuit combined with the neutral safety switch in an automotive starting circuit and a transmission disabling device controlled by the relay circuit for rendering the transmission inoperative during engine starting.

The above and other advantages of this invention will become more apparent from the following DRAWING which is a schematic illustration of an electrical control circuit combined with a hydraulic circuit for disabling a transmission according to the invention.

In general, the drawing depicts a battery 10, a conventional engine starting circuit 12, a switching circuit 14, a transmission 16 and a transmission range selector 18. The starting circuit 12 includes a conventional key-operated ignition switch 20 having a movable contact 22 connected to the battery 10 and which, when the "run" position as shown, bridges an accessory contact 24 and an ignition contact 26. The contact 22 is movable clockwise into a "start" position to bridge the ignition contact 26 and a start contact 28. The start contact 28 is connected by a line 29 to a conventional neutral safety switch 30 which as is well known, is controlled by the position of the range selector 18 so that the switch 30 is closed when the range selector 18 is in either of the neutral settings (P or N) and is open when in any of the drive settings (R, D or L). The neutral switch 30 is in turn connected by a line 31 to a conventional starter motor 32 which embodies not only a motor 34 per se but also a starter solenoid 36. The solenoid 36 has a connecting line 38 to the battery 10 and a ground line 40.

The switch circuit 14 includes a line 42 containing a diode 44 connecting the line 31 to a relay coil 46. The contact 46a of the relay coil 46 is connected between the ignition contact 26 and the transmission 16. A holding relay coil 48 is connected between the ignition contact 26 and the line 29 while the contact 48a of the holding relay is connected between the ignition contacts 26 and the relay coil 46. Both contacts 46a and 48a are normally open in the absence of energization of their respective coils.

The transmission 16 includes a transmission pump 50, a conventional transmission control 52, a sump 54, and a solenoid valve 56 electrically connected between ground and the contacts 46a. The solenoid valve 56 is preferably a spool valve of well known structure which is connected to the pump 50, the control 52 and the sump 54 in such a way that in the absence of electrical energization, the pump 50 is connected to the controls 52 in the normal fashion, but when the valve is electrically energized, it shifts so as to connect both the pump 50 and controls 52 to the sump 54 thereby rendering the transmission 16 inoperative to transfer driving power to the vehicle wheels.

In operation, it is the goal of the invention to disable the transmission 16 by energizing the solenoid valve 56 whenever the neutral safety switch 30 is closed; thereby insuring that during the starting period the transmission 16 is not capable of driving the vehicle. To start the vehicle engine, it is necessary to place the transmission range selector 18 in neutral or park position to thereby close the neutral switch 30, and to operate the ignition switch 20 so that the movable contact 22 will engage both contacts 26 and 28. Then electrical energy is permitted to flow through the ignition switch 20 and the neutral switch 30 to the starter solenoid 36. At the same time, however, current will flow through the diodes 44 and the relay coil 46 to close the contacts 46a thereby supplying current from the ignition contact 26 to the solenoid valve 56 to disable the transmission. During this time, the holding relay coil 48 is effectively short-circuited across the contacts 26 and 28. When the engine has started and the ignition switch 20 is released from the "start" position and returned to the "run" position as shown, contact 28 is no longer energized and current flows from the ignition contact 26 through the holding relay coil 48, the neutral switch 30 and the starting solenoid 36 to ground, thereby closing contacts 48a to maintain energization of the relay coil 46. The holding relay 48 then insures that the transmission 16 remains in its disabled condition after the engine has started and so long as the neutral switch 30 is closed. However, when the range selector 18 is shifted to one of the drive settings, the neutral switch 30 is opened and both relays 46 and 48 are deenergized allowing the valve 56 to return to its normal position, thereafter having no effect on the ordinary operation of the transmission 16.

Since obvious modifications and variations will occur to those skilled in the art, the foregoing description and drawing is intended as an illustration of the preferred embodiment of the invention and not as a limitation thereof.

We claim:

1. In a vehicle:
an engine starting motor, a transmission having a mechanism adapted selectively to establish a neutral condition or a drive condition, a manually operable selector having a neutral position, and elements interconnecting the last mentioned selector with the mechanism for manually controlled selecting operation but under some conditions selecting the drive condition when the manually operable selector is in a neutral position, and a manually operated switch having a "run" position and a "start" position and effective in the "start" position to energize the engine starting motor and in the "run" position to maintain the engine running, once started;
transmission disabling means independent of said mechanism effective when actuated positively to preclude said drive condition; and
means operative in response to actuation of the switch either to "start" or "run" position and concurrent selection of the manually operable selector to a "neutral" position, to actuate said transmission disabling means.

2. In a vehicle, an engine starting motor, a transmission, a transmission range selector having a "neutral" position wherein the transmission is subject to possible unintended drive operation, the range selector establishing contact between a first terminal and a second terminal when in said "neutral" position, and a manually operated switch having a "run" contact and a "start" contact, means establishing a starting circuit from a source of voltage through the "start" contact and first and second terminals in sequence to the engine starting motor, and in which the "run" contact only is connected to said source of voltage when the switch is in "run" position, the improvement comprising:

transmission disabling means effective when electrically energized positively to preclude said drive operation;

a first relay having normally open contacts and an operating coil;

means defining an energizing circuit from said "run" contact through the contacts of said first relay to said disabling means for energizing the disabling means when the first relay is energized;

a second relay having an operating coil connected between the "start" contact and the "run" contact and a pair of normally open contacts connected respectively to the "run" contact and the operating coil of the first relay for energizing the first relay, and therefore the second relay, when the "run" contact only is connected to the voltage source and the first and second terminals are in contact; and a means for maintaining energization of the first relay when the "start" and "run" contacts are both connected to the source of voltage and the first and second terminals are in contact.

3. In a vehicle, an engine starting motor, a transmission, a transmission range selector having a "neutral" position wherein the transmission is subject to possible unintended drive operation, the range selector establishing contact between a first terminal and a second terminal when in said "neutral" position, and a manually operated switch having a "run" contact and a "start" contact, means establishing a starting circuit from a source of voltage through the "start" contact and first and second terminals in sequence to the engine starting motor, and in which the "run" contact only is connected to said source of voltage when the switch is in "run" position, the improvement comprising:

transmission disabling means effective when electrically energized positively to preclude said drive operation;

a first relay having normally open contacts and an operating coil;

means defining an energizing circuit from said "run" contact through the contacts of said first relay to said disabling means for energizing the disabling means when the first relay is energized;

a second relay having an operating coil connected between the "start" contact and the "run" contact and a pair of normally open contacts connected respectively to the "run" contact and the operating coil of the first relay for energizing the first relay, and therefore the second relay, when the "run" contact only is connected to the voltage source and the first and second terminals are in contact; and means defining a unidirectional current conducting path from the second terminal of the range selector to the operating coil of the first relay and effective to energize the same when the range selector is in neutral position and said second terminal is energized.